3,323,998
CYCLOSERINE DOSAGES ENHANCED WITH D-SERINE

Vernon V. Young and Edward B. Hodge, Terre Haute, and Robert S. Baldwin, Montezuma, Ind., assignors to Commercial Solvents Corporation, a corporation of Maryland
No Drawing. Filed Aug. 24, 1964, Ser. No. 391,768
3 Claims. (Cl. 167—65)

This invention relates to the enhancement of the effect of D-serine to inhibit bacteria cell growth and is particularly concerned with a D-serine composition containing an antibiotic.

The inhibition of bacterial cell growth is desirable to curtail infections. Certain substances e.g. p-amino benzoic acid, are utilized by, and promote growth and/or reproduction of the cells. Other substances of similar chemical configuration e.g. sulfonamides, are absorbed, but are not utilizable, by the cell for growth. When a sulfonamide is present, the cells, failing to differentiate between them, absorb the sulfonamide along with the p-amino benzoic acid. The obsorption of the sulfonamide, which is not utilizable, results in a deficiency of growth factors in the cells which is deleterious to cell growth and thus cell growth is inhibited. The sulfonamide is referred to as a "competitive antagonist" for the p-amino benzoic acid in connection with cell growth.

D-alanine is a component of bacteria cell wall protein in cells which cause infection. It must be present to provide for normal cell growth. D-serine acts as a competitive antagonist for the D-alaine site in the cell wall. D-serine, although a competitive antagonist for D-alanine, has not been found completely satisfactory in this connection. For instance, ten mice infected with *pneumococcus* II were each orally administered 20 milligram doses of D-serine at 2 and 5 hours after being infected. Twenty-four hours after being infected, it was found that D-serine provided 20 percent protection i.e. 20 percent of the mice survived. When tested with *Streptococcus pyogenes* C-203, D-serine, in 10 milligram doses which were administered in a similar manner, failed to provide any protection.

In accordance with the present invention, it was surprisingly discovered that the competitive antagonist characteristic of D-serine can be enhanced with an antibiotic e.g. cycloserine. Cycloserine is employed with the D-serine in amounts sufficient to enhance the effectiveness of D-serine to inhibit cell growth and these amounts will generally range from about 0.01 to 50 weight percent, preferably from about 10 to 40 weight percent based on the weight of D-serine and cycloserine. The D-serine can be used with the antibiotic in the presence of additive materials and vehicles e.g. syrups, suspending agents, e.g. gum arabic or similar polysaccharides.

The following example will illustrate the invention but is not to be considered as limiting.

Example

A mixture of 10 milligrams of D-serine and 5 milligrams of cycloserine was administered as a dosage unit to mice infected with *Streptococcus pyogenes* C-203, a bacteria which utilized D-alanine as a growth factor. Each mouse was administered a dosage unit at 2 and 5 hours after being infected. Twenty-four hours after being infected, it was found that the mixture provided 50 percent protection, thus showing the advantageous enhancement by the cycloserine of the effectiveness of the D-serine in inhibition of the bacteria cell growth and consequent curtailment of the deleterious effect of the infection. This is particularly surprising when considering that the use of 10 milligram doses of cycloserine alone in a comparable test resulted in only the provision of 20 percent protection.

Although the invention has been described using cycloserine as the antibiotic, other antibiotics or combinations of antibiotics can be used. Such antibiotics include penicillin, erythromycin, Terramycin (oxytetracycline), Aureomycin (chlortetracycline), bacitracin, polymixin, carbomycin, chloramphenicol, tetracycline, and streptomycin.

It is claimed:

1. A composition in dosage unit form comprising at least 10 mg. of D-serine and at least 5 mg. of cycloserine to enhance the effectiveness of D-serine to inhibit bacteria cell growth.
2. The composition of claim 1 wherein the amount of cycloserine is from about 1 to 50 weight percent.
3. The composition of claim 1 wherein the amount of cycloserine is from about 10 to 40 weight percent.

References Cited

FOREIGN PATENTS 952,812   3/1964   Great Britain.

OTHER REFERENCES

Bondi et al., "Inhibition of Antibacterial Activity of Cycloserine by Alpha-Alanine," Proc. Soc. Exp. Biol. Med., October 1957.

Grula et al., "Inhibition in Synthesis of B-Alanine by D-Serine," Biochem. Biophys Acta. 74(4): 776–778 Sept. 10, 1963.

Moulder et al., "Inhibition of the Growth of Agents of the Psittacosis Group by D-Cycloserine and its Specific Reversal by D-Alanine," J. Bact. 85(3): 707–711, March 1963.

Shockman, "Reversal of Cycloserine Inhibition by D-Alanine," Proc. Soc. Exp. Biol. Med. 101(4): 693–695, August-September 1959.

Tanaka et al., "Synergism of D-4-Amino-3-Isoxazolidone and O-Carbamyl-D-Serine," J. Antibiotics (Tokyo), SERA 17(1): 8–10, January 1964.

Zygmunt, "Reversal of D-Cycloserine Inhibition of Bacterial Growth by Alanine," J. Bact. 84(1): 154–156, July 1962.

Zygmunt, "Antagonism of D-Cycloserine Inhibition of Mycobacterial Growth by D-Alanine," J. Bact. 85(6): 1217–1220, June, 1963.

LEWIS GOTTS, *Primary Examiner.*

SHEP K. ROSE, *Assistant Examiner.*